United States Patent
Seldal

(10) Patent No.: US 9,779,715 B1
(45) Date of Patent: Oct. 3, 2017

(54) METHOD FOR MAKING CONTOURED ACOUSTIC STRUCTURES

(71) Applicant: Hexcel Corporation, Dublin, CA (US)

(72) Inventor: Matthew Seldal, Burlington, WA (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 15/220,043

(22) Filed: Jul. 26, 2016

(51) Int. Cl.
| | |
|---|---|
| B32B 37/12 | (2006.01) |
| B32B 3/12 | (2006.01) |
| B64C 1/40 | (2006.01) |
| G10K 11/16 | (2006.01) |
| G10K 11/168 | (2006.01) |
| B32B 37/14 | (2006.01) |
| B32B 38/00 | (2006.01) |
| B64D 29/00 | (2006.01) |
| B32B 37/00 | (2006.01) |

(52) U.S. Cl.
CPC ............ G10K 11/161 (2013.01); B32B 37/12 (2013.01); B32B 37/146 (2013.01); B32B 38/0004 (2013.01); B64C 1/40 (2013.01); B64D 29/00 (2013.01); G10K 11/168 (2013.01); B32B 2307/10 (2013.01)

(58) Field of Classification Search
CPC ... B32B 37/12; B32B 37/146; B32B 38/0004; B32B 2037/1223; B32B 2307/10; B32B 3/12; B32B 7/12; B32B 7/14; B64C 1/40; B64D 29/06; B64D 33/06; G10K 11/168
USPC ........ 181/292, 288, 290, 214; 244/1 N, 131, 244/132; 156/306.6, 293
See application file for complete search history.

(56) References Cited

U.S. PATENT DOCUMENTS

| | | | | |
|---|---|---|---|---|
| 4,258,823 A * | 3/1981 | Ganz | ........................ | F02C 7/045 181/214 |
| 4,716,067 A * | 12/1987 | Moji | ..................... | B29C 70/865 156/292 |
| 5,776,579 A * | 7/1998 | Jessup | ........................ | B32B 3/12 181/288 |
| 6,017,413 A | 1/2000 | Franklin et al. | | |
| 6,565,942 B2 * | 5/2003 | Anderson | ........... | B29C 65/5042 428/116 |
| 7,296,655 B2 * | 11/2007 | Costa | ........................ | F02C 7/045 181/210 |
| 7,434,659 B2 | 10/2008 | Ayle | | |
| 7,510,052 B2 | 3/2009 | Ayle | | |
| 7,854,298 B2 | 12/2010 | Ayle | | |
| 7,866,440 B2 * | 1/2011 | Douglas | ................. | B64D 33/02 181/210 |
| 8,251,174 B2 * | 8/2012 | Welch | .................... | G10K 11/16 181/210 |

(Continued)

Primary Examiner — Edgardo San Martin
(74) Attorney, Agent, or Firm — W. Mark Bielawski; David J. Oldenkamp

(57) ABSTRACT

An existing acoustic honeycomb panel having a radius of curvature is cut into segments that have longitudinal and lateral sides that extend between the edges of the honeycomb. The segments are bonded together along their longitudinal or lateral sides to form a segmented acoustic honeycomb in which the radius of curvature is different from the radius of curvature of the original acoustic honeycomb panel. The shape of the longitudinal or lateral sides of the segments and the thickness of the adhesive bond can be controlled to provide segmented acoustic honeycomb panels that are tightly curved and which are suitable for use in demanding noise damping applications, such as jet engine nacelles.

20 Claims, 6 Drawing Sheets

(56) References Cited

U.S. PATENT DOCUMENTS

| | | | |
|---|---|---|---|
| 8,413,761 B2 | 4/2013 | Ayle | |
| 8,579,076 B2 | 11/2013 | Ayle et al. | |
| 8,607,924 B2 | 12/2013 | Ichihashi | |
| 8,733,500 B1 | 5/2014 | Ayle | |
| 8,905,189 B2 * | 12/2014 | Ayle | F02C 7/045 |
| | | | 181/213 |
| 8,985,513 B2 * | 3/2015 | Dean | B64C 1/40 |
| | | | 156/304.1 |
| 2004/0045765 A1 * | 3/2004 | Porte | F02C 7/045 |
| | | | 181/210 |
| 2011/0135887 A1 * | 6/2011 | Saff | B32B 3/06 |
| | | | 428/192 |
| 2014/0083798 A1 * | 3/2014 | Maze | B32B 3/12 |
| | | | 181/290 |
| 2014/0367512 A1 | 12/2014 | Dean et al. | |

* cited by examiner

METHOD FOR MAKING CONTOURED ACOUSTIC STRUCTURES

BACKGROUND OF THE INVENTION

1. Field of the Invention

The present invention relates generally to acoustic structures that are used to attenuate noise that emanates from a particular source. More particularly, the present invention is directed to making contoured acoustic structures.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed at the end located away from the engine and covered with a porous covering at the end located closest to the engine. The closing of the honeycomb cells with acoustic material in this manner creates an acoustic resonator that provides attenuation, damping or suppression of the noise. Acoustic septums are also usually incorporated into the interior of the honeycomb cells in order to provide the resonator with additional noise attenuation properties.

One way of incorporating acoustic septums into the honeycomb cells is to first form planar acoustic inserts from an acoustic material, such as an acoustic mesh or perforated acoustic film. The planar acoustic inserts are made larger than the cell openings. Accordingly, when the inserts are pushed into the cells with a plunger, they are folded into an acoustic septum in the form of a cap. The cap shape provides an anchoring portion that contacts the cell walls and a central septum portion which attenuates the sound waves in the cell. Once inserted into the cells, the friction between the anchoring portion of the acoustic septum cap and the honeycomb walls temporarily locks the acoustic septum cap in place. An adhesive is then used to permanently bond the anchoring portions of the inserted acoustic septum caps to the cell walls.

The permanent bonding of the acoustic septum caps is accomplished by dipping the entire honeycomb into a pool of liquid adhesive. The depth to which the honeycomb is dipped into the adhesive is chosen so that the anchoring portions of the inserted acoustic septum caps are immersed in the liquid adhesive. This adhesive dip process is particularly effective because it provides simultaneous bonding of the many hundreds of acoustic septums that are located within a typical honeycomb acoustic structure. An essential requirement of this procedure is that the honeycomb is planar or flat, so that the depth of immersion into the pool of adhesive is the same for all of the cells and is easily controlled. Acoustic honeycomb panels that utilize acoustic septum caps are described in detail in U.S. Pat. Nos. 7,434,659, 7,510,052, 7,854,298, 8,413,761, 8,579,076, 8,607,924 and 8,733,500, the contents of which are hereby incorporated by reference.

Many acoustic structures, such as jet engine nacelles, must be curved or contoured to provide a structure that surrounds the noise source. Curving or contouring of the flat acoustic honeycomb panels is typically accomplished by placing the flat panel on a curved mold surface. A combination of heat and pressure is then used to impart a curve to the panel that matches the mold surface. A number of smaller flat panels are typically assembled together to form a larger panel that is closer to the desired size of the final acoustic structure. The assembly of panels is contoured on a relatively large mold surface using heat and pressure. The assembled panels may be bonded together before, after or during formation of the contour on the mold The above procedure of molding flat acoustic honeycomb panels is suitable for forming acoustic structures where the radius of the curve (radius of curvature) is relatively long. However, there are a number of situations, especially in forming jet engine nacelles, where is it desirable to reduce the radius of the curve to provide a panel with a tighter curve or contour. Attempts to use molding procedures to form acoustic honeycomb panels with relatively tight curves have failed. For example, the honeycomb walls and septa become distorted when the radius of the curve is reduced beyond conventional limits. In addition, the bond lines between the panels and the node bonds located within the panels are subject to failure as the radius of the curve is reduced.

There presently is a need to provide a method for forming contoured acoustic honeycomb panels in which the curvature of the panel is relatively tight while at the same time avoiding the problems of structural distortion, acoustic distortion and bond failure that have been associated with attempts to use conventional procedures to mold such tightly curved panels.

SUMMARY OF THE INVENTION

In accordance with the present invention it was discovered that acoustic honeycomb panels can be made in which the curvature or contour of the panel is tighter than the contours presently obtainable using convention panel molding procedures. The present invention involves taking an existing acoustic honeycomb panel and cutting the panel into segments. The segments are then bonded or seamed together to form a segmented acoustic honeycomb panel that has a curvature which is tighter than the original panel. The segmented acoustic honeycomb panels were found to provide tightly curved acoustic honeycomb panels that are not structurally or acoustically distorted.

The present invention is based on a method where an existing acoustic honeycomb panel having a radius of curvature is cut into segments that have longitudinal and lateral sides that extend between the edges of the honeycomb. The segments are bonded together along their longitudinal or lateral sides to form a segmented acoustic honeycomb in which the radius of curvature is different from the radius of curvature of the original acoustic honeycomb panel. As a feature of the invention, it was discovered that the shape of the longitudinal or lateral sides of the segments and the thickness of the adhesive bond can be controlled to provide segmented acoustic honeycomb panels that are tightly curved and which are suitable for use in demanding noise damping applications, such as jet engine nacelles.

In one embodiment of the invention, the segments are bonded together along their longitudinal sides with the lateral sides being in the shape of a rectangle. The adhesive bond that is used to seam the segments together has a cross-sectional shape in the form of a wedge where the thickness of the adhesive bond varies from one edge of the honeycomb to the other. This combination of rectangular lateral sides and wedge-shaped adhesive bond lines allows one to alter the radii of curvature of the original panel without distorting the acoustic or structural properties of the panel.

In another embodiment of the invention, the segments are bonded together along their longitudinal sides with the lateral sides being in the shape of a trapezoid or wedge. The adhesive bond that is used to seam the segments together has a uniform thickness from one edge of the honeycomb to the other. This combination of wedge-shaped lateral sides and uniformly thick adhesive bond line also provides for alteration of the radii of curvature of the original panel without distorting the acoustic or structural properties of the panel.

As a feature of the present invention, one can take an existing acoustic honeycomb panel that is flat, or has been curved as much as possible using conventional heat molding procedures and tighten the curve even further without distorting the structural or acoustic properties of the panel. Such tightly curved contoured panels find particular use in the field of attenuating jet engine noise where the ability to providing tightly curved nacelles and other acoustic structures is an important design consideration.

The above described and many other features and attendant advantages of the present invention will become better understood by reference to the following detailed description when taken in conjunction with the accompanying drawings.

DETAILED DESCRIPTION OF THE INVENTION

Figure 1:
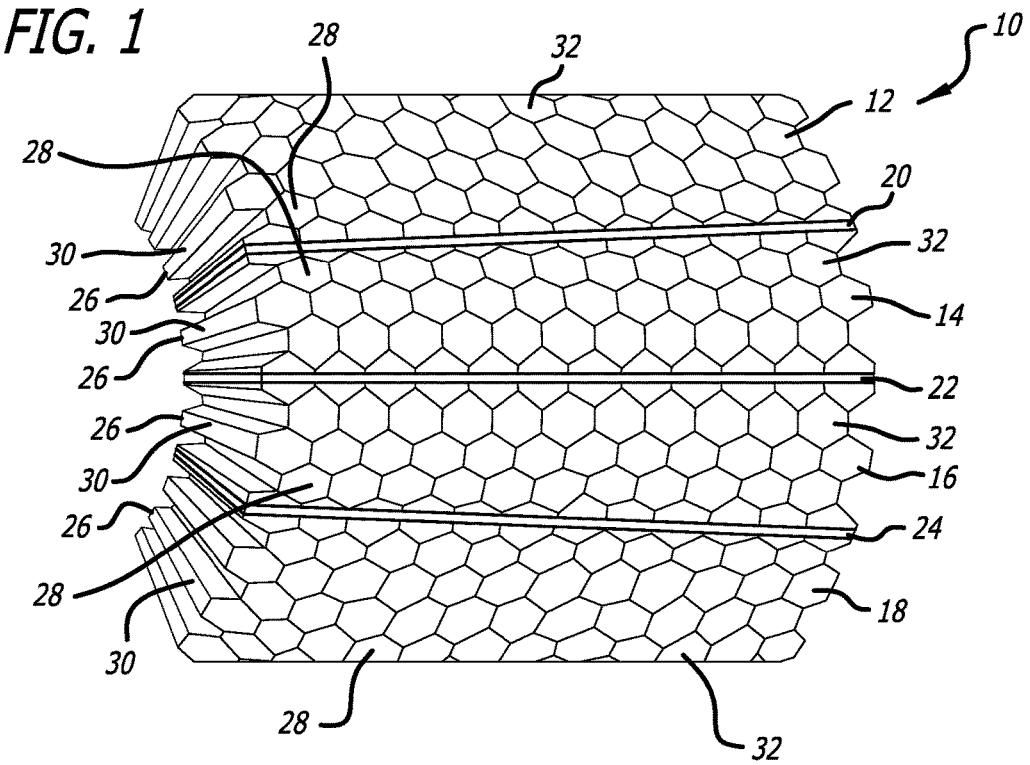
FIG. 1 is perspective view of an exemplary contoured acoustic honeycomb panel that has been made in accordance with present invention.

An exemplary contoured acoustic honeycomb panel for use in making acoustic structures in accordance with the present invention is shown generally at 10 in FIG. 1. The contoured acoustic honeycomb panel 10 includes four segments of honeycomb 12, 14, 16 and 18. The four honeycomb segments are bonded together along their longitudinal sides by adhesive bonds 20, 22 and 24 which are in the form of seams or bond lines. Each of the segments 12, 14, 16 and 18 is composed of a honeycomb having a first edge 26 which is to be located nearest the noise source and a second edge 28. The honeycomb in each of the segments includes walls 30 that extend between the two edges 26 and 28 to define a plurality of cells 32. Each of the cells 32 has a depth (also referred to as the core or panel thickness) that is equal to the distance between the two edges 26 and 28. Each cell 32 also has a cross-sectional area that is measured perpendicular to the cell walls 30.

Figure 10:
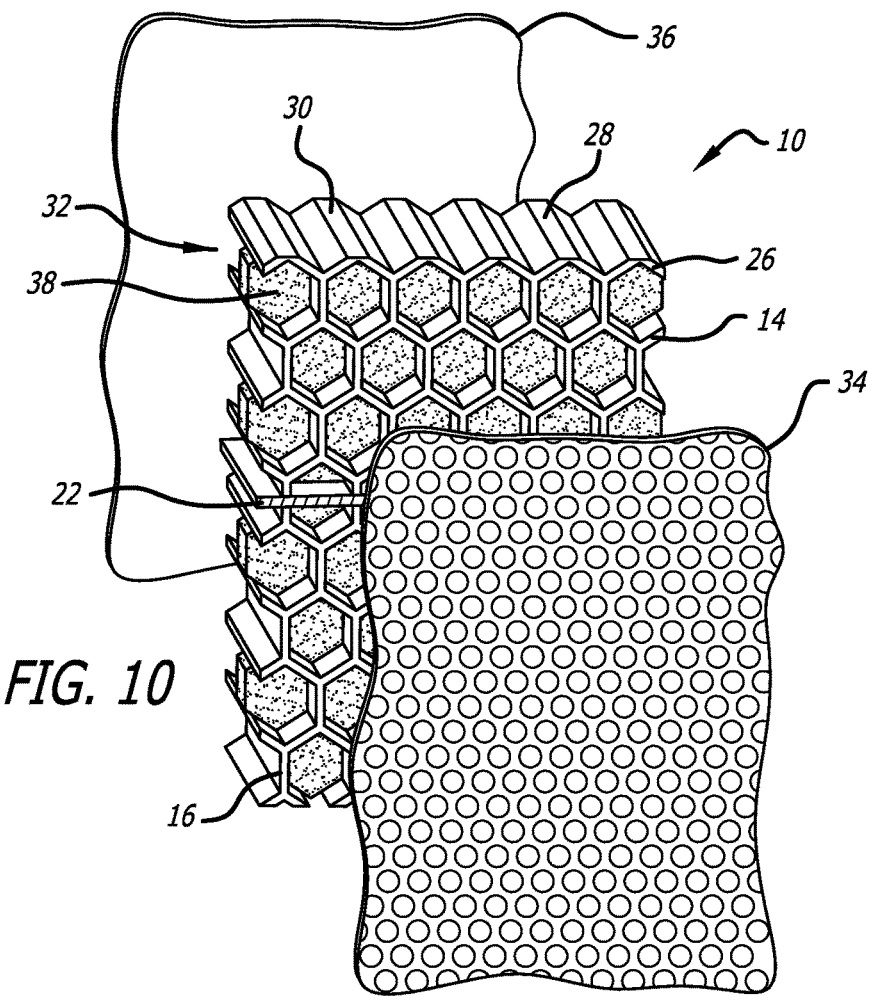
FIG. 10 is a view of a portion of an exemplary contoured acoustic honeycomb panel with the solid and porous face sheets that are typically combined with the panel to form an acoustic structure.
Figure 11:
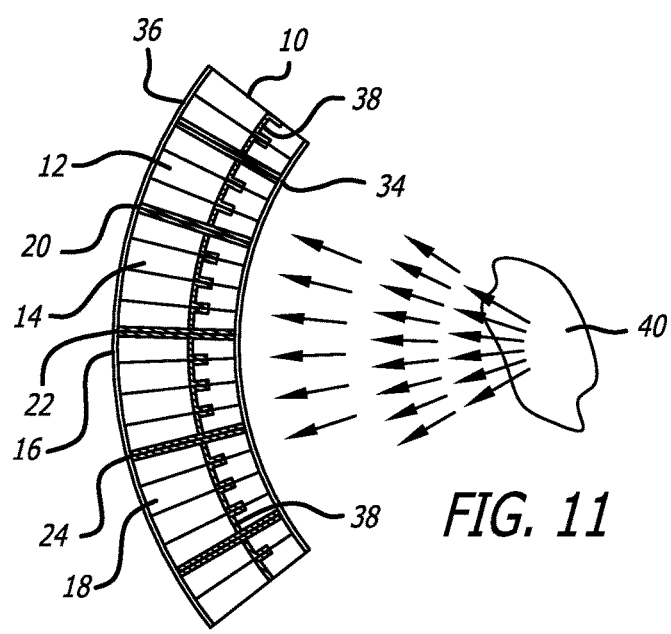
FIG. 11 shows an exemplary acoustic structure in place for attenuating the noise generated from a source.

As shown in FIG. 10, the acoustic honeycomb panel 10 is typically located between a porous face sheet 34 and a solid acoustic barrier face sheet 36 in order to form an acoustic structure, such as a jet engine nacelle. The solid acoustic barrier face sheet 36 forms an acoustic barrier at the bottom of the acoustic cells 32 that corresponds to the second edge 28 of the honeycomb. Individual solid acoustic barriers may be inserted into the cells 32 when it is desired that the acoustic bottom of the cells does not correspond to the second edge 28 of the acoustic honeycomb panel 10. Acoustic septa 38 are located in each cell 32. The septa 38 are preferably located closer to the first edge 26 than to the second edge as shown in FIGS. 10 and 11. In FIG. 11, a portion of the completed acoustic structure is shown in position as part of a nacelle surrounding one or more parts of a jet engine, which is shown diagrammatically at 40.

Figure 6:
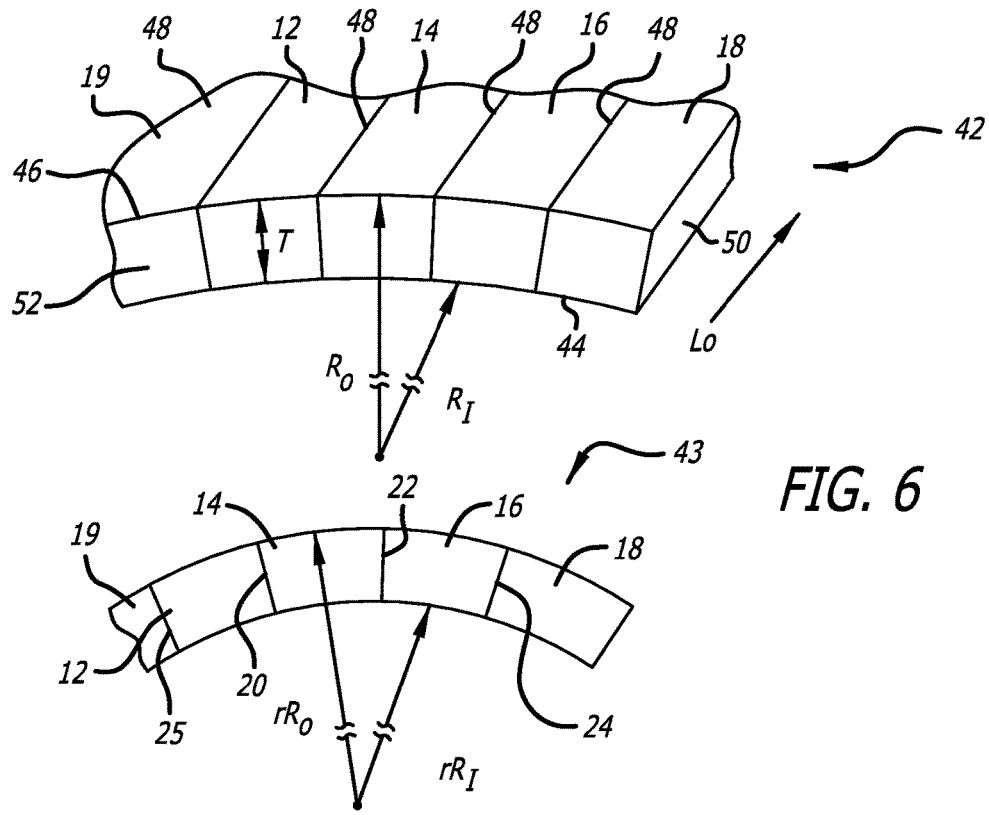
FIG. 6 is a diagrammatic representation showing how the present invention is used to reduce the radius of curvature and provide an acoustic honeycomb panel with a tighter contour.

The method of the present invention involves taking a flat or curved acoustic honeycomb panel and cutting it into specifically shaped segments that are then bonded together in a manner that alters the original shape of the panel such that tighter curves or contours are formed. For the purpose of this specification, an acoustic honeycomb panel is one in which acoustic septa have been inserted and bonded into place within the honeycomb cells. Referring to FIG. 6, an existing acoustic honeycomb panel 42 is shown that has been made using a conventional procedure where a flat acoustic honeycomb panel has been heated and curved on a mold surface as much as possible without distorting the cell walls or septa. The first edge 44 of the panel 42 has a curve with a radius of R and the second edge 46 has a curve with radius of $R_O$. The thickness (T) of panel 42 is cut through in the longitudinal direction (Lo) along lines 48 to form segments 12, 14, 16, 18 and 19 which each have longitudinal sides 50 and lateral sides 52. As a feature of the invention, the segments are then bonded together along their longitudinal sides at 20, 22, 24 and 25 in a manner that reduces the radii of curvature of $R_I$ and $R_O$ to $rR_I$ and $rR_O$, respectively, without further heat molding and without distorting the honeycomb walls or septa. The altered segmented acoustic honeycomb panel with the tighter contour is shown at 43 in FIG. 6.

Figure 2:
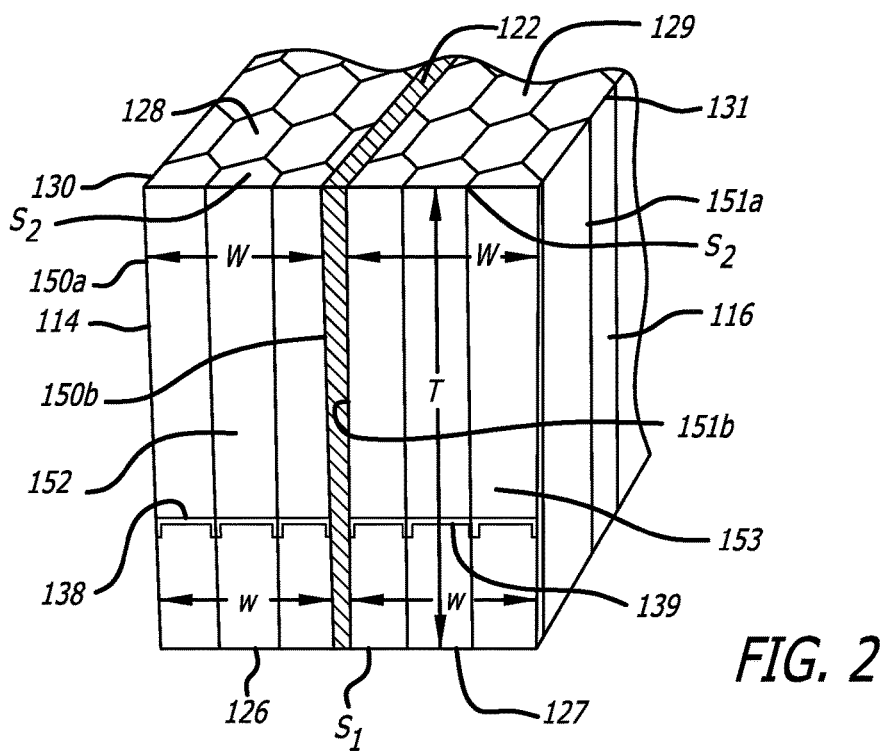
FIG. 2 is a side view of a portion of two rectangular segments of a first preferred exemplary contoured acoustic honeycomb panel that has been made in accordance with the present invention.
Figure 8:
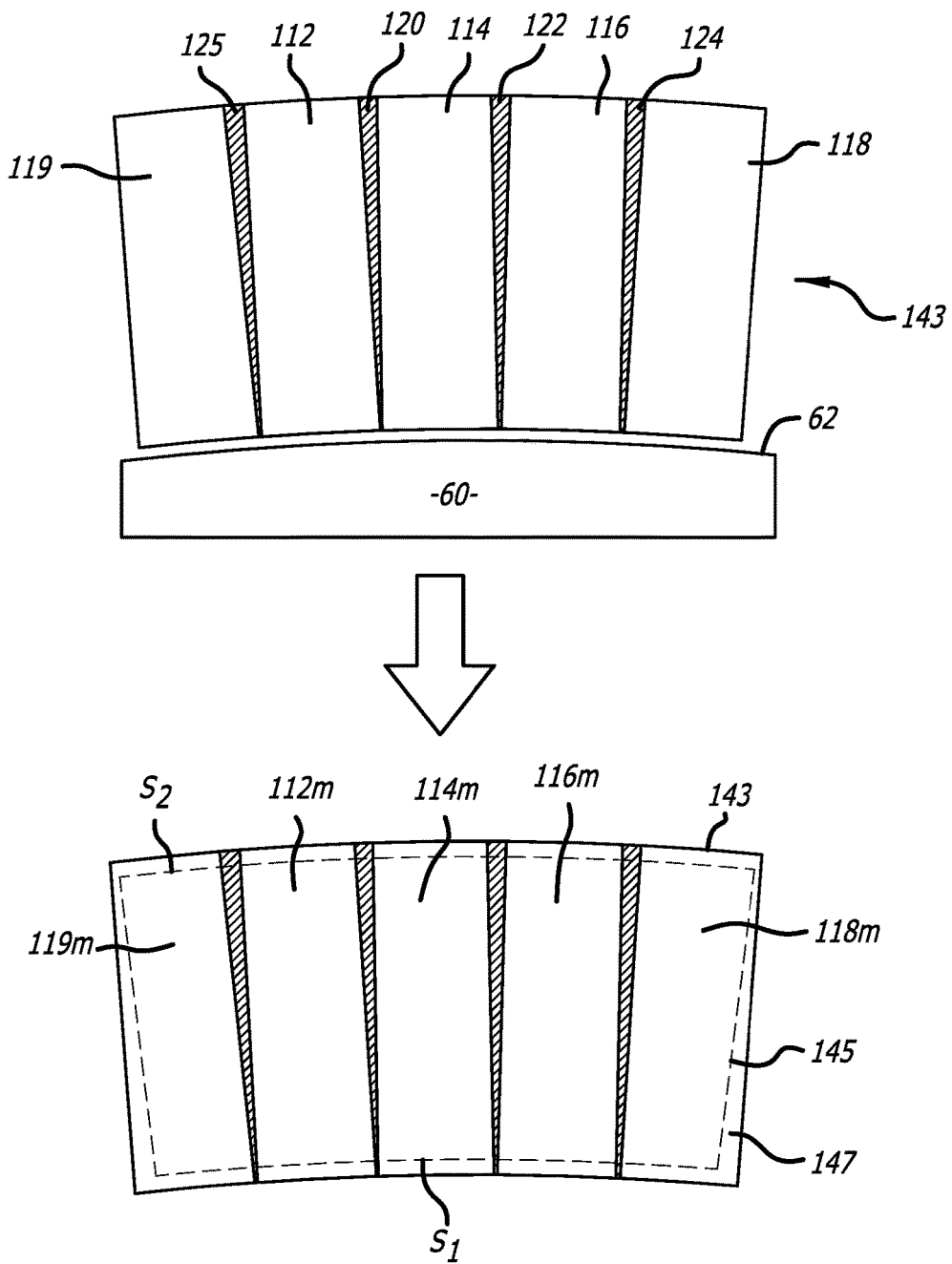
FIG. 8 is a diagrammatic representation showing the steps of using a mold to position the segments during formation of the first preferred exemplary contoured acoustic honeycomb panel followed by machining of the panel to further increase the tightness of the contour.

In a first preferred embodiment, the existing acoustic honeycomb panel is cut to form segments 112, 114, 116, 118 and 119 which, as shown in FIGS. 2 and 8, have lateral sides that are rectangular in shape and adhesive bonds that have a thickness which increases from the first edge of the panel to the second edge. Referring to FIG. 2 the first segment 114 is shown bonded to the second segment 116 by way of adhesive bond 122. The first segment has longitudinal sides 150*a*/150*b* and lateral side 152. The second segment 116 has longitudinal sides 151*a*/151*b* and lateral side 153. The first segment 114 has a first segment first edge surface 126 and a first segment second edge surface 128. The width (w) of the first segment first edge surface 126 is equal to the width (W) of the first segment second edge surface 128, so that the lateral face 152 is in the shape of a rectangle. The second segment 116 has a second segment first edge surface 127 and a second segment second edge surface 129. The width (w) of the second segment first edge surface 127 is equal to the width (W) of the second segment second edge surface 129, so that the lateral face 153 is also in the shape of a rectangle. The thickness (T) of the segments may be varied with respect to the width (w/W) so that a variety of rectangular shapes are possible including a square.

The first segment 114 includes the same septa 138 in cells 130 that were present in the original acoustic honeycomb panel and the curvatures of the first edge surface 126 and second edge surface 128 are the same as the original panel. The second segment 116 also includes the same septa 139 in cells 131 that were present in the original acoustic honeycomb panel and the curvatures of the first edge surface 127 and second edge surface 129 are the same as the original panel.

In this first preferred embodiment, the combined first edge surfaces 126 and 127 of the first and second segments 114 and 116 form a segmented surface ($S_1$) that has a radius of curvature ($rR_I$) that is less than the radius of curvature ($R_I$) of the original acoustic honeycomb panel. Likewise, the combined second edge surfaces 128 and 129 of the first and second segments 114 and 116 form a segmented surface ($S_2$) that has a radius of curvature ($rR_O$) that is less than the radius of curvature ($R_O$) of the original acoustic honeycomb panel.

Since the segments 114 and 116 in this first preferred embodiment have a rectangular shape, the required reduction in radii of curvature to $rR_I$ and $rR_O$ is achieved by bonding the segments together along their longitudinal faces 150*b* and 151*b* using a wedge-shaped adhesive bond line 122. The adhesive bond 122 is formed so that the thickness of the adhesive bond at the segmented first edge surface ($S_1$) is smaller or less than the thickness of the adhesive bond at the segmented second edge surface ($S_2$).

It was discovered that using rectangular segments in combination with a wedge-shaped adhesive bond made it possible to substantially reduce the radii of curvature of an acoustic honeycomb panel while still providing a structurally strong panel in which the acoustic properties of the original panel are not adversely affected by the reduction in the radii of curvature and the resulting tightening of the panel contour.

Figure 4:
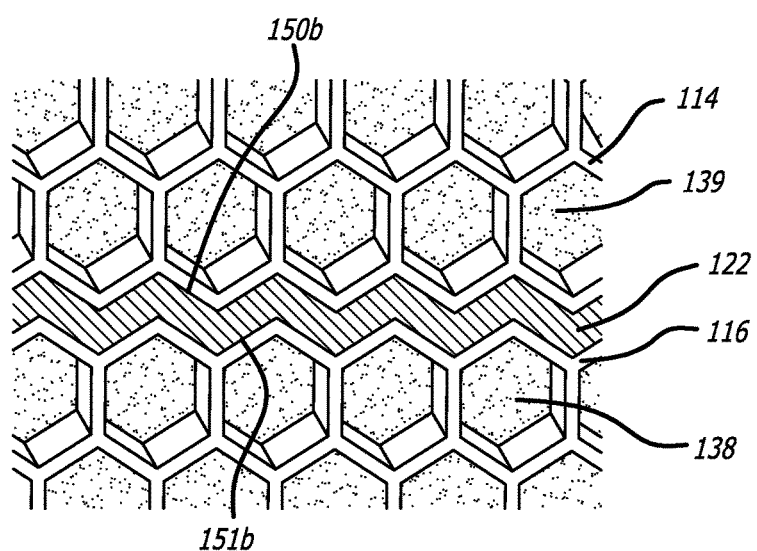
FIG. 4 is a top view of a portion of the first preferred exemplary contoured acoustic honeycomb panel showing the adhesive bond between the sides of the two rectangular segments.

When using a wedge-shaped adhesive bond in accordance with the first preferred embodiment, it is further preferred that the longitudinal faces 150*b* and 151*b* are shaped so that the segments can be "nested" together as shown in FIG. 4 to form a nested bond engagement. Nesting of the longitudinal faces 150*b* and 151*b* together provides an increase in surface area for bonding that is preferred when the adhesive bond 122 varies in thickness.

The amount of reduction in the radii of curvature achieved using the rectangular segments of the first preferred embodiment is determined and controlled by the variation in thickness of the wedge-shaped adhesive bond. A larger increase in thickness between the segmented first edge surface and segmented second edge surface results in a larger reduction in the radii of curvature. For typical 2 to 20 cm thick acoustic honeycomb panels that have hexagonal cells which are from 0.5 to 2 cm wide with cell walls that are from 0.25 mm to 10 mm thick, it is preferred that the adhesive bond have an increase in thickness of between from 1 mm to 5 mm. For example, preferred panel segments are from 4 to 10 cm thick (t) and from 3 to 8 cm wide (w). The adhesive bond is preferably from 0.5 to 2 mm thick at $S_1$ and increases in thickness to from 2 to 6 mm at $S_2$. When flat panel segments are used, it is possible to form altered segmented acoustic panels with this embodiment of the invention where the inner radii of curvature ($rR_I$) is below 100 cm and as low as 25 cm, especially for panels having a thickness (t) towards the lower end of the range. Even tighter curves are possible when the beginning panel segments are curved.

The formation of the adhesive bonds between rectangular segments is preferably carried out on a mold 60, as shown in FIG. 8. The mold has a curved surface 62 on which the rectangular segments 112, 114, 116, 118 and 119 are placed in order to form an altered acoustic panel 143. The curved surface 62 has a radius of curvature ($R_m$) that is close to or equal to the desired altered radius of curvature ($rR_I$). Wedge-shaped gaps are formed between the rectangular segments when they are secured onto the mold surface 62. The use of mold surface 62 to form wedge-shaped gaps is preferred in order to ensure accurate orientation of the segments and formation of the desired wedge-shaped adhesive bonds 120, 122, 124 and 125 between the segments. The adhesive used to form the bond line or seam can be applied to the segment faces either before or after the segments are oriented on the mold surface.

In addition to the use of wedge-shaped adhesive bonds to alter the contour of the original acoustic honeycomb panel, it is preferred that the exterior surfaces of the altered panel 143 be machined to further tighten the panel contour. As shown in the lower section of FIG. 8, the altered acoustic panel 143 is machined, as represented by phantom line 145, to remove excess honeycomb material 147 and form a machined panel that includes machined segments 112*m*, 114*m*, 116*m*, 118*m* and 119*m*. The outer surfaces of these machined segments are represented by the phantom line 145. This machining of the panel allows one to further reduce the radius of curvature ($rR_I$) of the segmented surface ($S_1$) and/or the radius of curvature ($rR_O$) of the segmented surface ($S_2$) to achieve even tighter curves when need. Machining of the panel can be used to further reduce the radii of curvature by up to 60 percent. In addition, the machining may be used to remove honeycomb material to make the exposed side faces of the machined panel more suitable for bonding to other panels, especially when the segments are being nested together for bonding.

A second preferred exemplary embodiment for making altered acoustic honeycomb panels in accordance with the present invention involves cutting the existing acoustic honeycomb panel 42 into segments which are wedge-shaped instead of the rectangular-shaped segments that are used in the first preferred embodiment. The wedge-shaped segments are bonded together using a uniformly thick adhesive bond to provide an altered acoustic honeycomb panel having a tighter contour.

Figure 3:
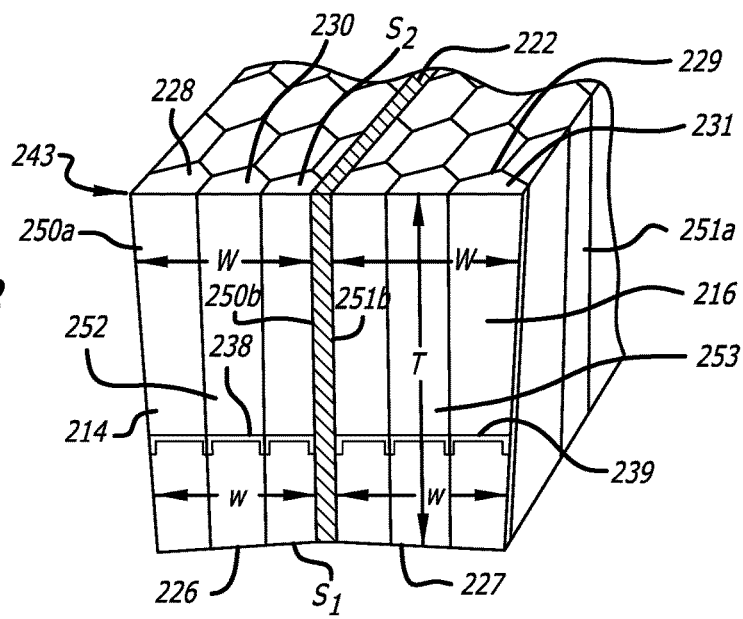
FIG. 3 is a side view of a portion of two wedge segments of a second preferred exemplary contoured acoustic honeycomb panel that has been made in accordance with the present invention.
Figure 5:
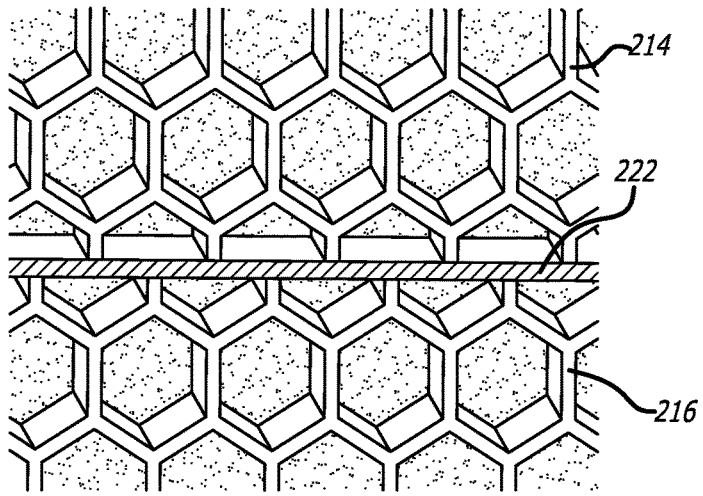
FIG. 5 is a top view of a portion of the second preferred exemplary contoured acoustic honeycomb panel showing the adhesive bond between the sides of the two wedge segments.
Figure 9:
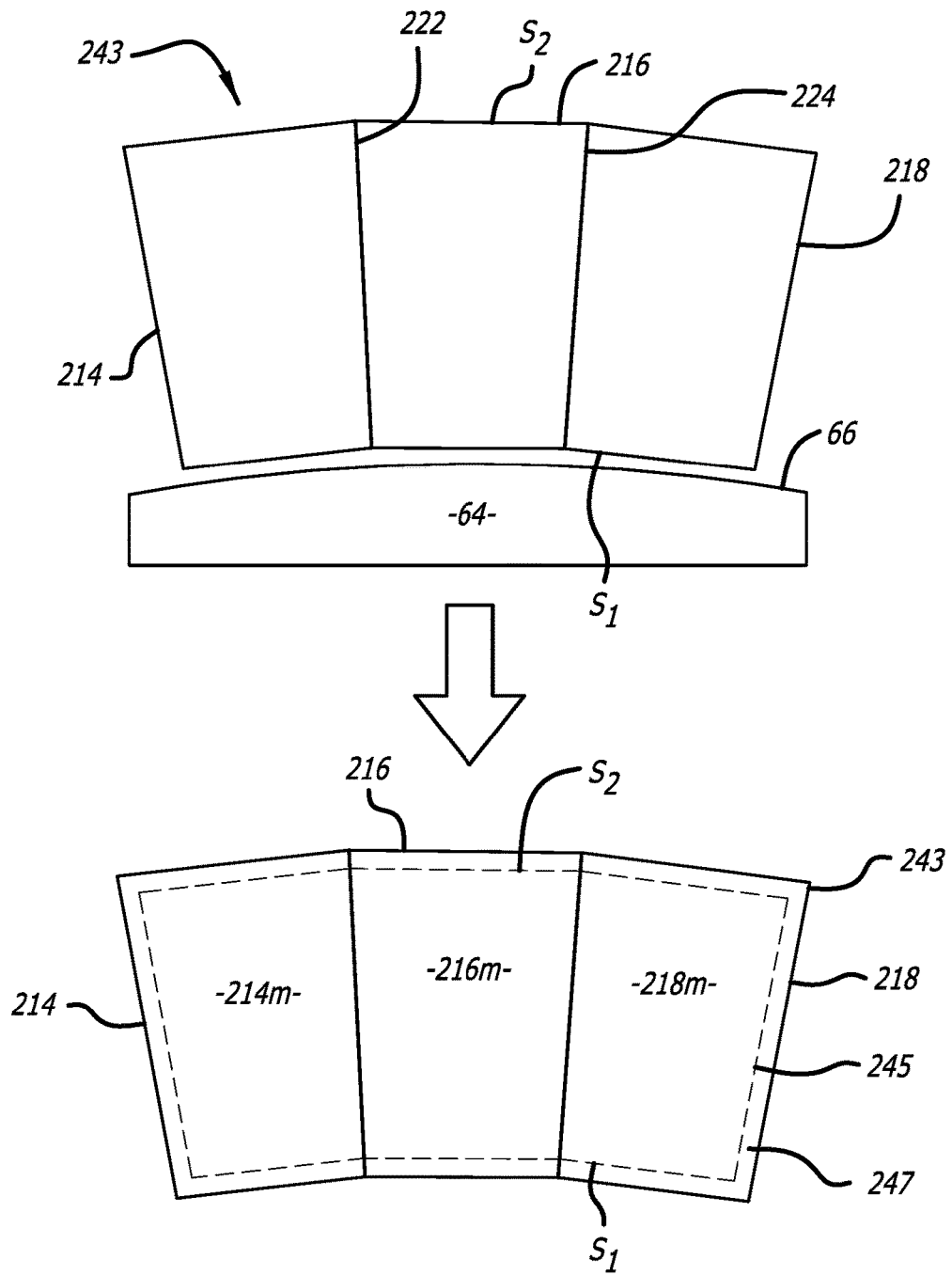
FIG. 9 is a diagrammatic representation showing the steps of using a mold to position the segments during formation of the second preferred exemplary contoured acoustic honeycomb panel followed by machining of the panel to further increase the tightness of the contour.

The second preferred exemplary embodiment is shown in FIGS. 3, 5 and 9. Referring to FIG. 3, the first segment 214 is shown bonded to the second segment 216 by way of adhesive bond 222. The first segment has longitudinal sides 250a/250b and lateral side 252. The second segment 216 has longitudinal sides 251a/251b and lateral side 253. The first segment 214 has a first segment first edge surface 226 and a first segment second edge surface 228. The width (w) of the first segment first edge surface 226 is less than the width (W) of the first segment second edge surface 228, so that the lateral face 252 is in the shape of a trapezoid or wedge. The second segment 216 has a second segment first edge surface 227 and a second segment second edge surface 229. The width (w) of the second segment first edge surface 227 is less than the width (W) of the second segment second edge surface 229, so that the lateral face 253 is also in the shape of a trapezoid or wedge. The thickness (T) of the segments may be varied with respect to the width (w/W) so that a variety of wedge shapes are possible.

The first segment 214 includes the same septa 238 in cells 230 that were present in the original acoustic honeycomb panel and the curvatures of the first edge surface 226 and second edge surface 228 are the same as the original panel. The second segment 216 also includes the same septa 239 in cells 231 that were present in the original acoustic honeycomb panel and the curvatures of the first edge surface 227 and second edge surface 229 are the same as the original panel.

In this second preferred embodiment, the combined first edge surfaces 226 and 227 of the first and second segments 214 and 216 form a segmented surface ($S_1$) that has a radius of curvature ($rR_I$) that is less than the radius of curvature ($R_I$) of the original acoustic honeycomb panel. Likewise, the combined second edge surfaces 228 and 229 of the first and second segments 214 and 216 form a segmented surface ($S_2$) that has a radius of curvature ($rR_O$) that is less than the radius of curvature ($R_O$) of the original acoustic honeycomb panel.

Since the segments 214 and 216 in this second preferred embodiment have a trapezoid or wedge shape, the required reduction in radii of curvature to $rR_I$ and $rR_O$ is achieved by bonding the segments together along their longitudinal faces 250b and 251b using an adhesive bond line 222 that has a constant or uniform thickness. The adhesive bond 222 is formed so that the thickness of the adhesive bond at the segmented first edge surface ($S_1$) is the same as the thickness of the adhesive bond at the segmented second edge surface ($S_2$).

It was discovered that using wedge-shaped segments in combination with a uniformly thick adhesive bond made it possible to substantially reduce the radii of curvature of an acoustic honeycomb panel while still providing a structurally strong panel in which the acoustic properties of the original panel are not adversely affected by the reduction in the radii of curvature and the resulting tightening of the panel contour.

When using wedge-shaped segments in accordance with the second preferred embodiment, it is not necessary that the longitudinal faces 250b and 251b be nested together as shown in FIG. 4. Instead, the longitudinal faces 250b and 251b can be aligned in any suitable orientation including a nested alignment or a non-nested alignment as shown in FIG. 5.

The amount of reduction in the radii of curvature achieved using the wedge-shaped segments of the second preferred embodiment is determined and controlled by the difference between the width (w) of the first edge surface and the width (W) of the second edge surface. The larger width (W) is in comparison to width (w), the larger the resulting reduction in the radii of curvature. For typical 2 to 20 cm thick acoustic honeycomb panels that have hexagonal cells which are from 0.5 to 2 cm wide with cell walls that are from 0.25 mm to 10 mm thick, it is preferred that the first edge surface width (w) be from 5 mm to 20 mm less than the second edge surface width (W). For example, panels that are from 4 to 10 cm thick are preferably cut into segments where w is from 3 to 7 cm and W is from 4 to 8 cm. It is preferred that the interior angle between the first edge surface and lateral sides of the segments be between 91 and 95 degrees. It is not necessary that both interior angles of a given segment be the same. The interior angles may be varied, especially in situations where a constant radius of curvature is not desired. When flat panel segments are used, it is possible to form altered segmented acoustic panels with this embodiment of the invention where the inner radii of curvature ($rR_I$) is below 100 cm and as low as 25 cm, especially for panels having a thickness (t) towards the lower end of the range. Even tighter curves are possible when the beginning panel segments are curved.

The formation of the adhesive bonds between wedge-shaped segments is preferably carried out on a mold 64, as shown in FIG. 9. The mold has a curved surface 66 on which the wedge-shaped segments 214, 216 and 218 are placed in order to form an altered acoustic panel 243. The curved surface 66 has a radius of curvature ($R_m$) that is close to or equal to the desired altered radius of curvature ($R_I$). Uniformly thick gaps are formed between the rectangular segments when they are secured onto the mold surface 66. The use of mold surface 66 to form wedge-shaped gaps is preferred in order to ensure accurate orientation of the wedge-shaped segments and formation of the desired uniformly thick adhesive bonds 222 and 224. The adhesive used to form the bond line or seam can be applied to the segment faces either before or after the segments are oriented on the mold surface.

In addition to the use of wedge-shaped segments to alter the contour of the original acoustic honeycomb panel, it is preferred that the exterior surfaces of the altered panel 243 be machined to further tighten the panel contour. As shown in the lower section of FIG. 9, the altered acoustic panel 243 is machined. as represented by phantom line 245, to remove excess honeycomb material 247 and form a machined panel that includes machined segments 214m, 216m and 218m. The outer surfaces of these machined segments are represented by the phantom line 245. This machining of the panel allows one to further reduce the radius of curvature ($rR_I$) of the segmented surface ($S_1$) and/or the radius of curvature ($rR_O$) of the segmented surface ($S_2$) to achieve even tighter curves when need. In addition, the machining may be used to remove honeycomb material to make the exposed side faces of the machined panel more suitable for bonding to other panels, especially when the segments are being nested together for bonding.

If desired, the above-described first and second preferred embodiments can be combined to achieve tight contours that may not be possible when either embodiment is used alone. For example, wedge-shaped segments in accordance with the second embodiment may be bonded together along their longitudinal faces using the wedge-shaped bonds of the first embodiment. This combination of wedge shapes for both the honeycomb segments and the bond lines between the segments allows one to achieve extremely tight contours when needed.

Figure 7:
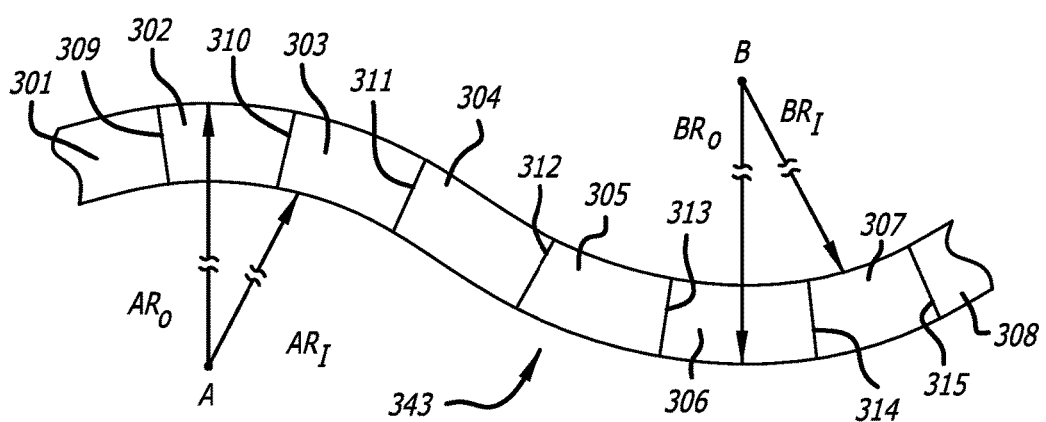
FIG. 7 is a diagrammatic representation showing how the present invention can be used to make contoured acoustic honeycomb panels having complex contours.

The present invention may be used to take existing flat or curved acoustic honeycomb panels and form altered panels having multiple curves. As shown in FIG. 7, an existing curved acoustic honeycomb panel, such as panel 42, has been cut into multiple segments 301-308 in accordance with the first and/or second preferred embodiments and bonded together along bond lines 309-315 to form a contoured panel 343 having at least two curves or contours with different radii of curvature. The first contour is located about a center A with the panel edge surfaces having radii of curvatures $AR_I$ and $AR_O$. The second contour is located about a center B with the panel edge surfaces having radii of curvatures $BR_I$ and $BR_O$. Both $AR_I$ and $BR_I$ of panel 343 are less than $R_I$ of the original panel. Both $AR_O$ and $BR_O$ of panel 343 are also less than $R_O$ of the original panel.

The honeycomb used in the acoustic panel can be made up of any of the materials that are typically used in acoustic honeycomb structures including metals, ceramics and composite materials, such as glass or carbon fibers combined with a resin matrix. A suitable acoustic honeycomb is composed of aramid paper that has been coated with a heat resistant resin, such as a phenolic resin. NOMEX® aramide paper and KEVLAR® aramid paper are produced by E.I. DuPont de Nemours & Company (Wilmington, Del.). Honeycomb made from these resin-coated papers is available commercially from Hexcel Corporation (Dublin, Calif.) under the tradename HexWeb® HRH. However, the invention is particularly well-suited for tightening the contours of acoustic honeycomb made from aluminum or glass fibers impregnated with a heat resistant resin, such as a phenolic resin. Preferred aluminum honeycomb is available commercially from Hexcel Corporation under the tradename HexWeb® CR-PAA-5056 with cell sizes of 1 cm width and core densities of 4.2 or 3.1 pounds per cubic foot (pcf). Preferred honeycomb made from glass fibers and a phenolic resin matrix are also available commercially from Hexcel Corporation under the tradename HexWeb® HTP with cell sizes of 1 cm width and core densities of 3.2, 3.5, 4.5 or 6.0 pcf.

The dimensions of the honeycomb that is cut into segments in accordance with the present invention can be varied widely. For noise suppression on aircraft, the honeycomb cores will typically have 0.5 cm to 2 cm wide hexagonal cells with the cores being 2 cm to 20 cm thick (distance between the honeycomb edges). The thickness of the honeycomb walls may also be varied with typical honeycomb walls being on the order of 0.25 mm to 10 mm thick. The combination of cell size, wall thickness and density of the material that is used determines the weight of the core. Honeycomb having weights on the order of 2 pcf to 8 pcf are preferred.

The materials used to make the solid acoustic barrier sheet 36 can also be any of the solid face sheet materials commonly used for acoustic structures which typically include the same type of materials used to make the honeycomb structure. The materials used to make the porous face sheet 34 can also be any of the materials commonly used for such porous structures provided that the pores or perforations in the structure are sufficient to allow the sound waves from the jet engine or other noise source to enter into the acoustic cells or resonators.

The septa or acoustic inserts are preferably made from an open mesh fabric that is woven from monofilament fibers. The fibers may be composed of glass, carbon, ceramic or polymers. Monofilament polymer fibers made from polyamide, such as polyamide 6 (Nylon, 6 PA6) and polyamide 12 (Nylon 12, PA12), polyester, polyethylene chlorotrifluoroethylene (ECTFE), ethylene tetrafluoroethylene (ETFE), polytetrafluoroethyloene (PTFE), polyphenylene sulfide (PPS), polyfluoroethylene propylene (FEP), polyether ether ketone (PEEK), are a few examples. For example, sheets of open mesh acoustic fabric may be obtained from SEFAR America Inc. (Buffalo Division Headquarters 111 Calumet Street Depew, NY 14043) under the trade names SEFAR PETEX, SEFAR NITEX and SEFAR PEEKTEX. Films made from the above listed septa materials may also be used provided that they are perforated to provide desired acoustic damping properties.

The adhesive that is used to bond the septa to the cell walls can be any of the conventional adhesives that are used in honeycomb panel fabrication. Preferred adhesives include those that are stable at high temperature (300-500° F.). Exemplary adhesives include epoxies, acrylics, phenolics, cyanoacrylates, bismaleimides, polyamide-imides, and polyimides.

The adhesive bonds or seams between the segments can be formed using any of the typical procedures used to bond honeycomb sections. A preferred bonding procedure involves the use of an adhesive that is carried by a honeycomb seam support or a linked-segment seam support as described in detail in U.S. Pat. No. 8,579,076, the contents of which are hereby incorporated by reference. Suitable adhesives for bonding the rectangular or wedge-shape honeycomb segments together include the same types of adhesives which are used to bond the septa to the honeycomb walls. The adhesive should be stable at high temperatures (300 to 500° F.). Exemplary segment bond or seam adhesives include epoxies, acrylics, phenolics, cyanoacrylates, bismaleimides, polyamide-imides and polyimides. Polyamide-imides are the preferred bond adhesive. When forming wedge-shaped adhesive bonds, the honeycomb seam support, if used, is preferably formed so that the thickness of the honeycomb seam support matches the variation in bond thickness.

The increase in curve or contour tightness that can be achieved using the method of the present invention will vary depending upon the initial radius of curvature of the existing panel that is cut into segments and the variations in shape of the wedge-shaped segments and/or wedge-shaped bond lines. The radius of curvature of conventional heat/pressure formed aluminum or glass fiber/phenolic resin acoustic panels that are used in jet engine nacelles is typically limited to about 100 cm and above. Using the method of the present invention it has been possible to reduce the radius of curvature of these types of acoustic honeycomb panels to well below 100 cm with radii of curvature as low as 25 cm being possible. These tight radii of curvature and the ability to make complex curves are provided by the invention with distorting the acoustic properties of the panels.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for altering the contour of an acoustic honeycomb panel for use in making acoustic structures that attenuate noise generated from a source, said method comprising the steps of:

A) providing one or more acoustic honeycomb panels comprising:
   a) a honeycomb comprising a first edge to be located closest to said source and a second edge wherein the distance between said first edge and second edge define the thickness of said honeycomb, said honeycomb comprising a plurality of cells that are defined by walls that extend between said first and second edges in a thickness direction, wherein the length of the honeycomb is defined by the number of cells in the lengthwise direction of the honeycomb and the width of the honeycomb is defined by the number of cells in the widthwise direction of the honeycomb, wherein said first edge defines a first edge surface having a first curvature and said second edge defines a second edge surface having a second curvature;
   acoustic septa located in said cells;
B) cutting said walls of the acoustic honeycomb panel along the thickness direction to form a first segment which comprises a portion of said acoustic honeycomb panel, said first segment comprising lateral sides that extend between said first and second edges of said honeycomb and longitudinal sides that extend between said first and second edges of said honeycomb, said first segment comprising a first segment first edge surface having said first curvature and a first segment second edge surface having said second curvature, wherein the first segment first edge surface has a length and a width and wherein the first segment second edge surface has a length and a width;
C) cutting said walls of the acoustic honeycomb panel along the thickness direction to form a second segment which comprises a portion of said acoustic honeycomb panel, said second segment comprising lateral sides that extend between said first and second edges of said honeycomb and longitudinal sides that extend between said first and second edges of said honeycomb, said second segment comprising a second segment first edge surface having said first curvature and a second segment second edge surface having said second curvature, wherein the second segment first edge surface has a length and a width and wherein the second segment second edge surface has a length and a width;
D) forming an adhesive bond between a longitudinal or lateral side of said first segment and a longitudinal or lateral side of said second segment, said adhesive bond having a bond height extending in the thickness direction of said honeycomb and a bond thickness measured between said first and second segments, said adhesive bond forming a segmented acoustic panel having a segmented first edge surface which is formed by the first segment first edge surface and the second segment first edge surface wherein said segmented first edge surface has a first segmented curvature, said segmented acoustic panel further having a segmented second edge surface which is formed by the first segment second edge surface and the second segment second edge surface wherein said segmented second edge surface has a second segmented curvature and wherein forming said adhesive bond includes the step of controlling the thickness of said adhesive bond and the shape of said longitudinal or lateral sides of said first and second segments such that the said first segmented curvature is different from said first curvature and second segmented curvature is different from said second curvature to thereby alter the contour of said acoustic honeycomb panel.

2. The method for altering the contour of an acoustic honeycomb panel according to claim 1 wherein said adhesive bond is formed so that the thickness of said adhesive bond at said segmented first edge surface is smaller than the thickness of said adhesive bond at said segmented second edge surface.

3. The method for altering the contour of an acoustic honeycomb panel according to claim 2 wherein the step of forming said adhesive bond comprises the steps of adhesively bonding a longitudinal side of said first segment to a longitudinal side of said second segment wherein the walls of said acoustic honeycomb panel are cut so that the width of said first segment first edge surface is equal to the width of said first segment second edge surface and the width of said second segment first edge surface is equal to the width of said second segment second edge surface.

4. The method for altering the contour of an acoustic honeycomb panel according to claim 3 wherein the walls of said honeycomb on the longitudinal side of said first segment are adhesively bonded to the walls of said honeycomb on the longitudinal side of said second segment such that said walls form a nested bond engagement.

5. The method for altering the contour of an acoustic honeycomb panel according to claim 2 wherein said septa are located closer to the first edge of said honeycomb that to the second edge of said honeycomb.

6. The method for altering the contour of an acoustic honeycomb panel according to claim 1 wherein the step of forming said adhesive bond comprises the steps of adhesively bonding a longitudinal side of said first segment to a longitudinal side of said second segment wherein the walls of said acoustic honeycomb panel are cut so that the width of said first segment first edge surface is less than the width of said first segment second edge surface and the width of said second segment first edge surface is less than the width of said second segment second edge surface.

7. The method for altering the contour of an acoustic honeycomb panel according to claim 6 wherein said adhesive bond is formed so that the thickness of said adhesive bond at said segmented first edge surface is equal to the thickness of said adhesive bond at said segmented second edge surface.

8. The method for altering the contour of an acoustic honeycomb panel according to claim 7 wherein the walls of said honeycomb on the longitudinal side of said first segment are adhesively bonded to the walls of said honeycomb on the longitudinal side of said second segment such that said walls do not form a nested bond engagement.

9. The method for altering the contour of an acoustic honeycomb panel according to claim 1 which includes the additional step of machining said segmented first edge surface to form a machined first edge that has a curvature which is different from said first segmented curvature.

10. The method for altering the contour of an acoustic honeycomb panel according to claim 9 which includes the additional step of machining said segmented second edge surface to form a machined second edge that has a curvature which is different from said second segmented curvature.

11. The method for altering the contour of an acoustic honeycomb panel according to claim 1 wherein said first curvature has a first radius and a first center located closer to said first curvature than said second curvature, said first segmented curvature having an altered first radius which is shorter than said first radius and wherein said second curvature has a second radius and a second center located closer to said first curvature than said second curvature, said second segmented curvature having an altered second radius which is shorter than said second radius.

12. The method for altering the contour of an acoustic honeycomb panel according to claim 11 wherein said first curvature and said second curvature are concentric.

13. The method for altering the contour of an acoustic honeycomb panel according to claim 1 wherein said first curvature has a first radius and a first center located closer to said second curvature than said first curvature, said first segmented curvature having an altered first radius which is shorter than said first radius and wherein said second curvature has a second radius and a second center located closer to said second curvature than said first curvature, said second segmented curvature having an altered second radius which is shorter than said second radius.

14. The method for altering the contour of an acoustic honeycomb panel according to claim 13 wherein said first arc and said second arc are concentric.

15. The method for altering the contour of an acoustic honeycomb panel according to claim 11 wherein said septa are located closer to the first edge of said honeycomb that to the second edge of said honeycomb.

16. The method for altering the contour of an acoustic honeycomb panel according to claim 13 wherein said septa are located closer to the first edge of said honeycomb that to the second edge of said honeycomb.

17. The method for altering the contour of an acoustic honeycomb panel according to claim 1 wherein the thickness of said acoustic honeycomb panel is from 2 to 20 centimeters.

18. The method for altering the contour of an acoustic honeycomb panel according to claim 17 wherein the said first curvature has a radius of curvature of between 25 and 100 centimeters.

19. A method for making an acoustic structure comprising the steps of:
   A) providing an acoustic honeycomb panel made according to the method of claim 1;
   B) covering said segmented first edge surface with a porous face sheet; and
   C) covering said segmented second edge surface with a solid face sheet.

20. An aircraft engine nacelle that comprises an acoustic structure made according to the method of claim 19.

* * * * *